(12) United States Patent  (10) Patent No.: US 8,694,320 B2
Kirkeby  (45) Date of Patent: Apr. 8, 2014

(54) AUDIO WITH SOUND EFFECT GENERATION FOR TEXT-ONLY APPLICATIONS

(75) Inventor: Ole Kirkeby, Espoo (FI)

(73) Assignee: Nokia Corporation, Espoo (FI)

( * ) Notice: Subject to any disclaimer, the term of this patent is extended or adjusted under 35 U.S.C. 154(b) by 938 days.

(21) Appl. No.: 12/597,937

(22) PCT Filed: Apr. 24, 2008

(86) PCT No.: PCT/IB2008/001006
§ 371 (c)(1),
(2), (4) Date: Feb. 15, 2010

(87) PCT Pub. No.: WO2008/132579
PCT Pub. Date: Nov. 6, 2008

(65) Prior Publication Data
US 2010/0145705 A1    Jun. 10, 2010

(30) Foreign Application Priority Data
Apr. 28, 2007   (CN) .......................... 2007 1 0107719

(51) Int. Cl.
*G10L 13/00*   (2006.01)

(52) U.S. Cl.
USPC .......................................... 704/260; 704/258

(58) Field of Classification Search
USPC ................................................ 704/258, 260
See application file for complete search history.

(56) References Cited

U.S. PATENT DOCUMENTS

| | | | |
|---|---|---|---|
| 5,561,736 A | 10/1996 | Moore et al. | |
| 7,103,548 B2 | 9/2006 | Squibbs et al. | |
| 7,260,533 B2 | 8/2007 | Kamanaka | |
| 2002/0193996 A1* | 12/2002 | Squibbs et al. | 704/260 |
| 2003/0028380 A1 | 2/2003 | Freeland et al. | |
| 2003/0078780 A1* | 4/2003 | Kochanski et al. | 704/258 |
| 2003/0163316 A1 | 8/2003 | Addison et al. | |
| 2004/0179605 A1 | 9/2004 | Lane | |
| 2005/0144002 A1* | 6/2005 | Ps | 704/266 |
| 2007/0055527 A1 | 3/2007 | Jeong et al. | |
| 2007/0233494 A1* | 10/2007 | Shen et al. | 704/260 |
| 2008/0167875 A1* | 7/2008 | Bakis et al. | 704/258 |

FOREIGN PATENT DOCUMENTS

| | | |
|---|---|---|
| GB | 2376387 A | 12/2002 |
| JP | 07-13581 H | 1/1995 |
| JP | 2001-127900 A | 5/2001 |
| JP | 2002221980 A | 8/2002 |

(Continued)

OTHER PUBLICATIONS

Office Action received in corresponding Korean Application No. 10-2009-7022343, Dated Nov. 22, 2011, 8 pages.

(Continued)

*Primary Examiner* — Daniel D Abebe
(74) *Attorney, Agent, or Firm* — McClure and Associates, PLLC

(57) ABSTRACT

A method of generating audio for a text-only application comprises the steps of adding tag to an input text, said tag is usable for adding sound effect to the generated audio; processing the tag to form instructions for generating the audio; generating audio with said effect based on the instructions, while the text being presented. The present invention adds entertainment value to text applications and provides very compact format compared to conventional multimedia as well as uses entertainment sound to make text-only applications such as SMS and email more fun and entertaining.

20 Claims, 1 Drawing Sheet

(56) References Cited

FOREIGN PATENT DOCUMENTS

| JP | 2002311979 A | 10/2002 |
|---|---|---|
| JP | 2003030113 A | 1/2003 |
| JP | 2003-150522 A | 5/2003 |
| JP | 2005-312527 A | 11/2005 |
| KR | 20050104777 A | 11/2005 |
| KR | 2007-0028764 | 3/2007 |
| KR | 20070028764 A | 3/2007 |

OTHER PUBLICATIONS

Office Action received in corresponding Chinese Application No. 200710107719.5, Dated Dec. 31, 2011, 10 pages.

Extended European Search Report and Written Opinion, received in corresponding European (EP) Application No. 08762688.3, dated Feb. 9, 2012. 7 pages.

Office Action dated Jul. 20, 2012 for corresponding Chinese Application No. 200710107719.5, 3 pages.

Office Action received from corresponding Chinese Application No. 200710107719.5, dated Sep. 10, 2010, 11 pages.

Office Action received from corresponding Japanese Application No. 2010-504890, dated Jul. 21, 2011, 6 pages.

Office Action received from corresponding Korean Application No. 10-2009-7022343, dated Feb. 11, 2011, 8 pages.

"International Search Report of the International Searching Authority", received in corresponding PCT Application No. PCT/IB2008/001006, Dated Dec. 8, 2008, 5 pages.

Office Action received in corresponding Japanese Application No. 2012-276836, dated Oct. 28, 2013, 5 pages.

* cited by examiner

AUDIO WITH SOUND EFFECT GENERATION FOR TEXT-ONLY APPLICATIONS

RELATED APPLICATION

This application was originally filed as PCT Application No. PCT/IB2008/001006 filed Apr. 24, 2008, which claims priority to CN Application No. 200710107719.5 filed Apr. 28, 2007.

FIELD OF THE INVENTION

The invention generally relates to the use and generation of audio in text-only applications such as SMS, email, books, and newspapers.

BACKGROUND OF THE INVENTION

The vast majority of text content is unlikely to be updated to contain graphics and sound despite the increasing focus on multimedia capabilities of mobile devices. 'Archived' formats such as books and newspapers as well as message formats such as SMS and email will remain popular in their present form for a very long time. There is currently an opening for a technology that can add the appeal of multimedia to the text format which is not very exciting on its own.

The most obvious solution to this problem is to store and/or transmit the added multimedia content with the original text content. However, this increases the amount of data by at least an order of magnitude since the text format is much more compact than graphics and sound. U.S. Pat. No. 7,103,548 disclosed a system for converting a text message into audio form, the text message having embedded emotion indicators and feature-type indications, the latter of which serve to determine which of multiple audio-form presentation feature types are to be used to express, in the audio form of the text message, the emotions indicated by said emotion indicators. And currently MSN Messenger allows for the sender to write tags in a text that is then translated into a picture at the receiving end. However, preparing the content in advance eliminates the possibility of a context-dependent 'surprise effect'. Furthermore, if a certain ambient soundscape, say, rain and wind, is added to the speech and played back through a single loudspeaker in a conventional mobile device it will sound like disturbing background noise and reduce intelligibility.

There are several formats suitable for storing and presenting multimedia content. The best known is SMIL (Synchronized Multimedia Integration Language). For material aimed at publication on the World Wide Web, ACSS (Audio Cascaded Style Sheets) can be used to define some properties of the sound. In combination with SSML (Speech Synthesis Markup Language, recommended by W3) it is possible to do some basic real-time rendering of sound and speech.

Accordingly, there is no markup language or corresponding software architecture suitable for performing real-time sound synthesis and rendering of sound effect, particularly stereo or 3D sound in text-based applications.

SUMMARY OF THE INVENTION

It is an object of the present invention to provide a method which use entertainment sound, particularly stereo or 3D audio, to make text applications such as SMS and email more fun and entertaining.

To achieve the above object, the present invention provides a method of generating audio for a text-only application, comprising: adding tag to an input text, said tag is usable for adding sound effect to the generated audio; processing the tag to form instructions for generating the audio; generating audio with said sound effect based on the instructions, while the text being presented.

The present invention also provides A device of generating audio for a text-only application, comprising: a tag adder for adding a tag to an input text, said tag is usable for adding sound effect to the generated audio; a tag processor for processing the tag to form instructions for generating the audio; an audio generator for generating audio with said sound effect based on the instructions, while the text being presented.

The present invention also provides a communication terminal capable of generating audio for a text-only application, comprising: a tag processor for processing tag added in an input text and usable for adding sound effect to the generated audio, to form instructions for generating the audio; an audio generator for generating audio with sound effect based on the instructions, while the text being presented.

The communication terminal can further comprise a tag adder for adding the tag to the input text.

The use of the present invention can produce audio in the form of 3D, spatial enhancement and effects. For example, the use of stereo or 3D audio also allows sound to be added unintrusively to speech such that if the soundscape is processed for a stereo or 3D effect and played back over stereo headphones, or two closely spaced loudspeakers, it can be spatialized in such a way that it does not interfere with the speech. For example, if the listener hears the rain and wind at the sides and the speech at the center the intelligibility is not affected.

Also, this invention intends to increase the context-dependent "surprise effect or value", by adding randomness to the generated audio effects, such that for example, when the audio is generated on the fly the rendering algorithm can take into account information about the time (morning/day/evening, weekday/weekend, summer/winter) or the location of the user (home/car/office, country).

Furthermore, the invention allows excellent possibility for customization and adds entertainment value to text applications and adds multimedia 'class' to plain text. The present invention also provides very compact format compared to conventional multimedia. Because the present invention is not platform specific, the device of this invention decides how to do the rendering.

BRIEF DESCRIPTION OF THE DRAWINGS

Above and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Referring to the accompanying drawings, the present invention will now be described in detail.

Figure 1:
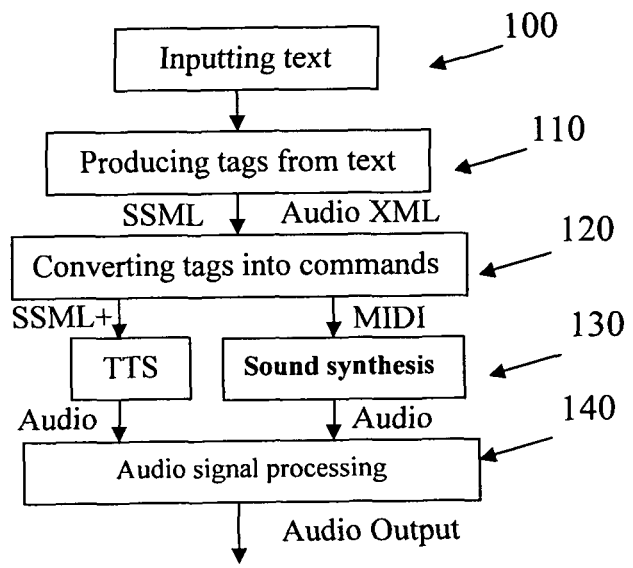
FIG. 1 is a flowchart of the method of generating audio for a text-only application according to the present invention.

FIG. 1 shows a flowchart of the method of generating audio for a text-only application according to the present invention.

In step 100, text applications, such as SMS, email, audio books or the like are input.

In step 110, tags are produced from the input text. Preferably, two sets of tags are produced for audio processing (described later). These tags can be inserted manually in special cases, such as by user or generated by terminal including mobile phone, PDA (personal digital assistant), laptop computer and any other devices which are capable of adding tags into text. To implement this step, a plurality of markup languages can be used, which including but not limited to VoiceXML (for voice UI and audio rendering of web pages), JSML (JSpeech Markup Language (Java, by Sun)), STML (Spoken Text Markup Language), Sable (attempt to combine JSML and STML), SSML (Speech Synthesis Markup Language recommended by W3), SMIL (Synchronized Multimedia Integration Language for multimedia presentations). ACSS (Audio Cascaded Style Sheets) can also be involved in this step. It can be used to define some properties of the sound, specify both speech synthesis and audio, as well as overlap voice with audio. In addition, ACSS has some spatial audio features (e.g., azimuth, elevation). According to this invention, a new markup language, such as an audio XML format, which includes tags that applies to speech, music, and audio effects, can be established to be used to add sound effect such as stereo or 3D sound effects to audio. For example, the input Message is 'Sorry I missed your call. I was playing tennis at the time. I won'. Exemplary pseudo tags are: <continuous play: background music> Sorry I missed your <audio substitute: call>. I was playing tennis <audio icon: tennis> at the time. I won! <audio icon: fireworks><end play: background music>.

In step 120, the tags added in step 110 are converted into commands that can be used to synthesize the sound as well as produce the messages that control the audio processing which either can be used as the input of the audio processing. For the sound synthesis, MIDI messages can be used. For the speech synthesis, extended version of SSML is can be used (hence the reference to SSML+ in FIG. 1). Step 120 can include a feature: randomization. The exact repetition of sounds very quickly becomes boring, or even annoying, to the listener. In the audio design of games, for example, it is common to record an actor repeating the same line several times so that the user does not have to listen to exactly the same sample many times. Randomness can be inserted in many different ways. Some examples are as follows:

General
    Vary low-level rendering parameters (voice, musical instrument)
    Vary choice of 'Sound icons' (short sounds equivalent to 'smiles')
    Vary spatial effects and post-processing
Speech
    Articulation
    Vary timing of events (speech rhythm, pauses)
    Modify text without modifying meaning
Music
    Use algorithmic music generation
    Modify pitch and/or tempo of sound samples
Effects
    Render similar sounds differently Audio rendering can support low-level control of some rendering parameters (e.g., values embedded in MIDI messages), footsteps, for example, can be varied in timing, pitch, and duration, so that it always sounds like a different occurrence of the same event.

The advantage of randomization is obvious that it adds surprise value and prevents user from being bored or annoyed with exact repetitions and prevents rendered audio from being too predictable as well as obtains excellent possibilities for adjusting settings according to individual preferences.

In step 130, the input from step 120 is processed to output audio. For speech synthesis, TTS (Text-To-Speech) engine can be employed to convert tagged text (e.g., SSML+) into speech. TTS systems have improved dramatically in the last few years. Artifacts make speech sound 'chopped up' rather than 'robotic'. Quality of speech can be made very natural but good quality TTS means intensive computation both in MIPS and memory. For audio synthesis, two types of synthesis audio are needed including music and effects (e.g., footsteps, seashore and birdsong). MIDI which is suitable as control language can include effect settings (reverb, chorus and so on), priority (SP-MIDI), timestamps and some low-level parameters that affect the sound. Wavetable synthesis which is employed in MIDI can do both music and effects reasonably well. A wavetable synthesis engine (audio synthesis engine) (see FIG. 1) is GM1 compliant (General MIDI) and can be made GM2 compliant, supports DLS (Downloadable Sounds) format and all main sampling rates.

Then the flow proceeds to step 140, the output audio from step 130 is further processed.

Figure 2:
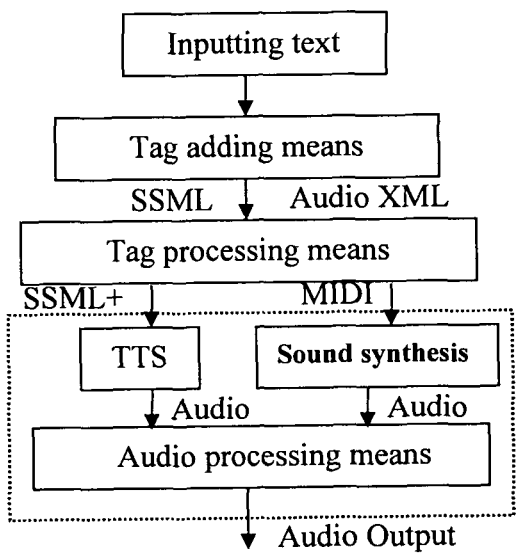
FIG. 2 is a block diagram of the device of generating audio for a text-only application according to the present invention.

Now referring to FIG. 2, it shows a device of generating audio for a text-only application according to the present invention for correspondingly performing the method in the flowchart of FIG. 1. Upon receipt of a text-only application, the tag adding means produces sets of tags for the input text. These tags can also be inserted manually in special cases, such as by user or generated by terminal including mobile phone, PDA (personal digital assistant), laptop computer and any other devices which are capable of adding tags into text. Preferably, two sets are produced by tag adding means. One set is effectively for the TTS engine, and for this purpose a format such as SSML can be used. The other is effectively for the audio synthesis engine which can generate both sound effects and music. Such a format can be referred to as audio XML (see FIG. 2). In the case of an application such as SMS the tag adding means can be run on the terminal of either the sender or the receiver.

The tag processing means then converts the tags into low-level commands that can be used to synthesize the sound and produce the messages that control the audio processing as well as add 'Surprise Value'. For the sound synthesis, MIDI messages can be used. For the TTS a slightly extended version of SSML is can be used (hence the reference to SSML+ in FIG. 2). The tag processing means must be run on the terminal of the listener. The tag processing means can include a feature: randomization. With a sound synthesis engine subtle variation can be implemented by small changes in the low-level commands. Footsteps, for example, can be varied in timing, pitch, and duration, so that it always sounds like a different occurrence of the same event.

An audio generating means (see dashed portion of FIG. 2) receive the output from tag processing means. For speech synthesis, TTS engine is advantageously employed to perform processing. For audio synthesis, a wavetable synthesis engine is advantageously employed to do both music and effects reasonably well.

An audio processing means performs such as 3D algorithms and post-effects with output from the TTS and audio synthesis engines. Audio processing means is capable of implementing at least one of the following functions: Positional audio, Mono-to-3D spatial enhancement, Stereo widening, Reverberation, EQ (Equalizer) and DRC (Dynamic Range Control). Furthermore, the audio processing means optionally supports Sample rate conversion, Mixing, Real-time change of parameters (3D position, T60 for reverb).

The device of this invention can be implemented in a communication terminal capable of generating audio for a text-only application, comprising a tag processing means for processing tag added in an input text and usable for adding sound effect to the generated audio, to form instructions for generating the audio; an audio generating means for generating audio with sound effect based on the instructions, while the text being presented. Alternatively, the communication terminal can further comprise a tag adding means for adding the tag to the input text. The communication terminal is for example a mobile terminal.

Although specific embodiments of the invention have been disclosed, those having ordinary skill in the art will understand that changes can be made to the specific embodiments without departing from the spirit and scope of the invention. The present invention focuses on audio but an equally strong case can be made for adding graphics to text applications. The scope of the invention is not to be restricted, therefore, to the specific embodiments, and it is intended that the appended claims cover any and all such applications, modifications, and embodiments within the scope of the present invention.

What is claimed is:

1. A method comprising:
   receiving an input text;
   generating a tag from the input text, wherein said tag is usable for adding a sound effect to text to speech audio generated by the application for the input text;
   processing the tag to form instructions for generating the audio;
   generating audio with said sound effect based on the instructions.

2. The method of claim 1, further comprising displaying the input text during generation of the audio.

3. The method of claim 1, wherein the said tags apply to at least one of speech, music, or audio effect.

4. The method of claim 1, wherein said processing the tag further comprises adding randomness.

5. The method of claim 4, wherein said adding randomness is implemented by changes in the instructions, such that said changes vary at least one of manners or parameters, for generating the audio.

6. The method of claim 5, wherein said manners or parameters include at least one of low-level rendering parameters, choice of sound icons, spatial effects and post-processing, articulation, timing of events, modifying text without modifying meaning, using algorithmic music generation or rendering similar sounds differently.

7. The method of claim 1, wherein said generating audio with sound effect further comprises performing speech synthesis with text to speech engine.

8. The method of claim 1, wherein said generating audio with sound effect further comprises performing audio synthesis with an audio synthesis engine.

9. A device comprising:
   a tag adder for receiving an input text and generating a tag from the input text, wherein said tag is usable for adding a sound effect to audio generated by the application for the input text, the audio including text to speech audio, the audio including text to speech audio;
   a tag processor for processing the tag to form instructions for generating the audio;
   an audio generator for generating audio with said sound effect based on the instructions.

10. The device of claim 9, wherein the said tags apply to at least one of speech, music, or audio effect.

11. The device of claim 9, wherein the audio generator uses said instructions to synthesize the audio and control audio processing.

12. The device of claim 9, wherein the said tag processor adds randomness.

13. The device of claim 12, wherein the tag processor implements said randomness by changes in the instructions, such that said changes vary at least one of manners or parameters, for generating the audio.

14. The device of according to claim 13, wherein said manners or parameters include at least one of low-level rendering parameters, choice of sound icons, spatial effects and post-processing, articulation, timing of events, modifying text without modifying meaning, using algorithmic music generation or rendering similar sounds differently.

15. The device of claim 9, wherein the said audio generator further comprises at least one of a text to speech engine for performing speech synthesis or an audio synthesis engine for performing audio synthesis.

16. A communication terminal comprising:
   a tag adder for receiving an input text and generating a tag from the input text, wherein said tag is usable for adding a sound effect to text to speech audio generated by the application for the input text, the audio including text to speech audio;
   a tag processor for processing the tag to form instructions for generating the audio;
   an audio generator for generating audio with a sound effect based on the instructions.

17. The communication terminal of claim 16, wherein the tag adder adds the tag to the input text.

18. The method of claim 1, wherein generating the tag from the input text is performed absent user insertion.

19. The device of claim 9, wherein generating the tag from the input text is performed absent user insertion.

20. The communication terminal of claim 16, wherein generating the tag from the input text is performed absent user insertion.

* * * * *